United States Patent
Moritani et al.

(10) Patent No.: US 9,609,172 B2
(45) Date of Patent: Mar. 28, 2017

(54) APPROVAL DEVICE, APPROVAL SYSTEM, AND RECORDING MEDIUM THAT ENSURE SIMPLIFIED APPROVAL OPERATION OF ELECTRONIC DOCUMENT

(71) Applicant: Kyocera Document Solutions Inc., Osaka (JP)

(72) Inventors: Yuri Moritani, Osaka (JP); Ryosuke Ogishi, Osaka (JP); Wataru Endo, Osaka (JP); Akira Yuki, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/929,339

(22) Filed: Nov. 1, 2015

(65) Prior Publication Data

US 2016/0127609 A1    May 5, 2016

(30) Foreign Application Priority Data

Oct. 31, 2014   (JP) .................. 2014-222615

(51) Int. Cl.
  H04N 1/44   (2006.01)
  H04N 1/00   (2006.01)
  G06K 9/00   (2006.01)

(52) U.S. Cl.
  CPC ......... H04N 1/442 (2013.01); G06K 9/00221 (2013.01); H04N 1/00251 (2013.01); H04N 1/00411 (2013.01); H04N 1/444 (2013.01); H04N 1/4426 (2013.01); H04N 2201/0094 (2013.01)

(58) Field of Classification Search
None
See application file for complete search history.

(56) References Cited

U.S. PATENT DOCUMENTS

| 6,671,805 | B1 * | 12/2003 | Brown | H04L 9/3247 713/170 |
| 2003/0215114 | A1 * | 11/2003 | Kyle | G06F 21/32 382/115 |
| 2010/0053691 | A1 * | 3/2010 | Kuyper-Hammond | G06T 1/0028 358/3.28 |

(Continued)

FOREIGN PATENT DOCUMENTS

| JP | H9-288609 A | 11/1997 |
| JP | H11-250151 A | 9/1999 |

(Continued)

*Primary Examiner* — Thomas D Lee
(74) *Attorney, Agent, or Firm* — James Judge

(57) ABSTRACT

An approval device includes a storage circuit, a document acquiring circuit, an imaging circuit, a face recognition circuit, an approval circuit and an editing circuit. The storage circuit stores a face image database, the face image database registering face image data of at least one user to be an approver for approving a document. The document acquiring circuit acquires the document. The imaging circuit images a face of the approver for approving the document. The face recognition circuit analyzes an imaged face image of the approver and searches the face image database stored in the storage circuit using the analysis result. The approval circuit approves the document based on the search result. The editing circuit attaches one of an electronic stamp and an electronic signature to the approved document.

7 Claims, 11 Drawing Sheets

(56) References Cited

U.S. PATENT DOCUMENTS

2015/0295922 A1* 10/2015 Dunn .................. H04L 63/0861
                                                       713/178

FOREIGN PATENT DOCUMENTS

| JP | 2004-295693 A | 10/2004 |
|---|---|---|
| JP | 2005-062931 A | 3/2005 |
| JP | 2006-136450 A | 6/2006 |
| JP | 2007-041831 A | 2/2007 |
| JP | 2007-281713 A | 10/2007 |
| JP | 2012-165293 A | 8/2012 |
| WO | WO-2005-103971 A1 | 11/2005 |

\* cited by examiner

APPROVAL DEVICE, APPROVAL SYSTEM, AND RECORDING MEDIUM THAT ENSURE SIMPLIFIED APPROVAL OPERATION OF ELECTRONIC DOCUMENT

INCORPORATION BY REFERENCE

This application is based upon, and claims the benefit of priority from, corresponding Japanese Patent Application No. 2014-222615 filed in the Japan Patent Office on Oct. 31, 2014, the entire contents of which are incorporated herein by reference.

BACKGROUND

Unless otherwise indicated herein, the description in this section is not prior art to the claims in this application and is not admitted to be prior art by inclusion in this section.

For approving an electronic document, an approver having approval authority has performed approval operations and given one of a stamp of the approver's electronic seal and an electronic signature to an approved-by column of the document in order to indicate that the document was approved.

For enhancing reliability in the approving processes, for example, there is provided a technique that reads an IC card of a user with an IC card reader in order to first identify the user. Subsequently, a face of the user is captured as a moving image with a monitoring camera for identifying human-body and recorded so as to reuse the moving image later.

For facilitating the stamp usage, there is provided another technique that can give the stamp on the approved electronic document being sent around, and also easily change an image of the stamp given to the electronic document as necessary.

SUMMARY

An approval device according to an aspect of the disclosure includes a storage circuit, a document acquiring circuit, an imaging circuit, a face recognition circuit, an approval circuit and an editing circuit. The storage circuit stores a face image database, the face image database registering face image data of at least one user to be an approver for approving a document. The document acquiring circuit acquires the document. The imaging circuit images a face of the approver for approving the document. The face recognition circuit analyzes an imaged face image of the approver and searches the face image database stored in the storage circuit using the analysis result. The approval circuit approves the document based on the search result. The editing circuit attaches one of an electronic stamp and an electronic signature to the approved document.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
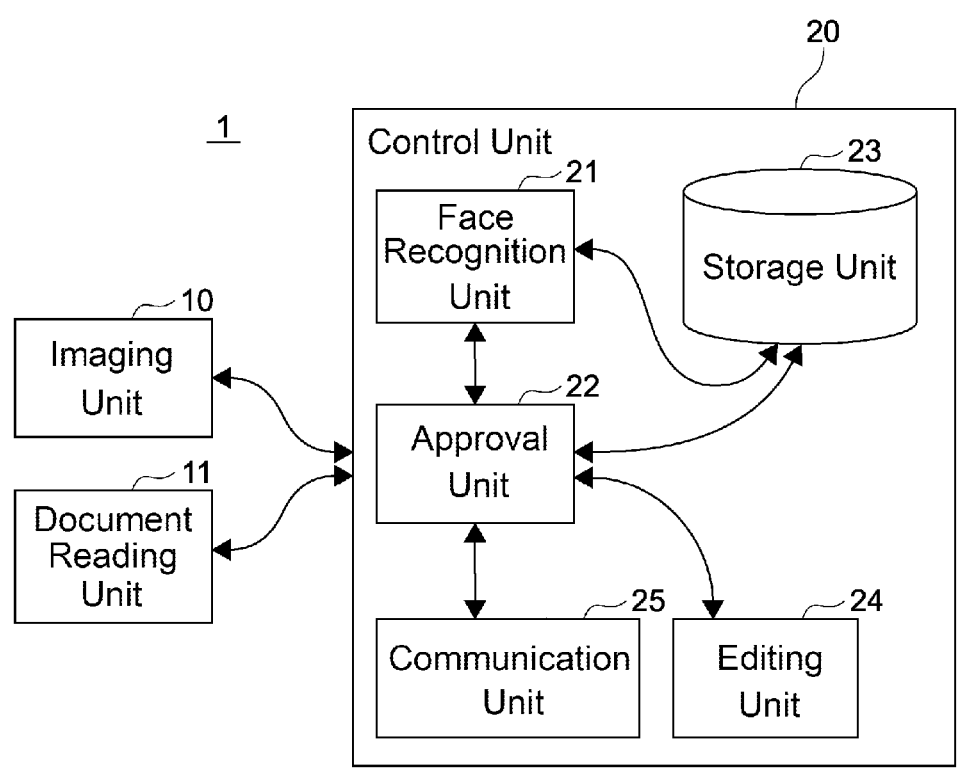
FIG. 1 illustrates a general basic configuration of an approval device according to an embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Hereafter, a description will be given of the embodiments of the disclosure with reference to the attached drawings.
Configuration First, a configuration of an approval device according to an embodiment of the disclosure will be described. In the following description, a general basic configuration of the approval device will be described. Subsequently, a description of a configuration when enabling the approval device to function as an image forming apparatus (multifunction peripheral: MFP) will be provided.
Basic Configuration First, a general basic configuration of the approval device will be described. FIG. 1 illustrates a general basic configuration of an approval device 1 according to the embodiment of the disclosure.

The approval device 1 includes an imaging unit 10, a document reading unit (which is also referred to as "document acquiring unit") 11, and a control unit 20. The control unit 20 includes a face recognition unit 21, an approval unit 22, a storage unit 23, an editing unit 24, and a communication unit 25.

The imaging unit 10 is a circuit that images a face of an approver who approves a document. The imaging unit 10 may employ a typical camera.

The document reading unit 11 is a circuit that reads for electronizing a document where the document being approved by the approver is the document printed on a paper medium. The document reading unit 11 may employ a scanner or a similar device.

The control unit 20, which is a processor including a control circuit that performs the entire control of the approval device 1, can be achieved with a general-purpose personal computer (PC) or a similar device.

The face recognition unit 21 is a circuit that performs a face recognition processing for the approver's face imaged by the imaging unit 10. The face recognition processing includes a process to detect a human face from among the images imaged, and a process to determine whether or not data of the detected face exists as face image data stored in the storage unit 23.

The approval unit 22 is a circuit that performs an approval processing for the document inputted by the document reading unit 11 or a similar unit based on analysis results of the face recognition unit 21.

The storage unit 23 is a circuit that stores the face image data of the approver as a user of the approval device 1.

The editing unit 24 is a circuit that attaches proof of approval to the document so as to give a stamp of an electronic seal and an electronic signature to the electronic document approved by the approval unit 22. The editing unit 24 may automatically detect an approved-by column in the document and put the stamp and the electronic signature to the detected approved-by column. Additionally, a position in which the stamp or the electronic signature is put may be predetermined.

The editing unit 24 may attach the approver's face image to the document in addition to the stamp and the electronic signature. According to this configuration, a person who has received the approved document can verify the approver's face image. This improves approval reliability of the approved document.

The editing unit 24 may attach information together regarding a date and place in which the approver's face image has been imaged, in addition to the stamp and the electronic signature. According to this configuration, for example, in such cases as where a person receiving the approved document knows a schedule of the approver, verifying the schedule with the approved date and place enables the person to determine whether or not any person other than the approver himself or herself performs approval operations. This improves approval reliability.

The communication unit 25 is a circuit that performs communications for exchanging information including the face image and the approved document with other equipment.

Up to this point, the general basic configuration of the approval device 1 has been described.

Configuration as Image Forming Apparatus

Figure 2:
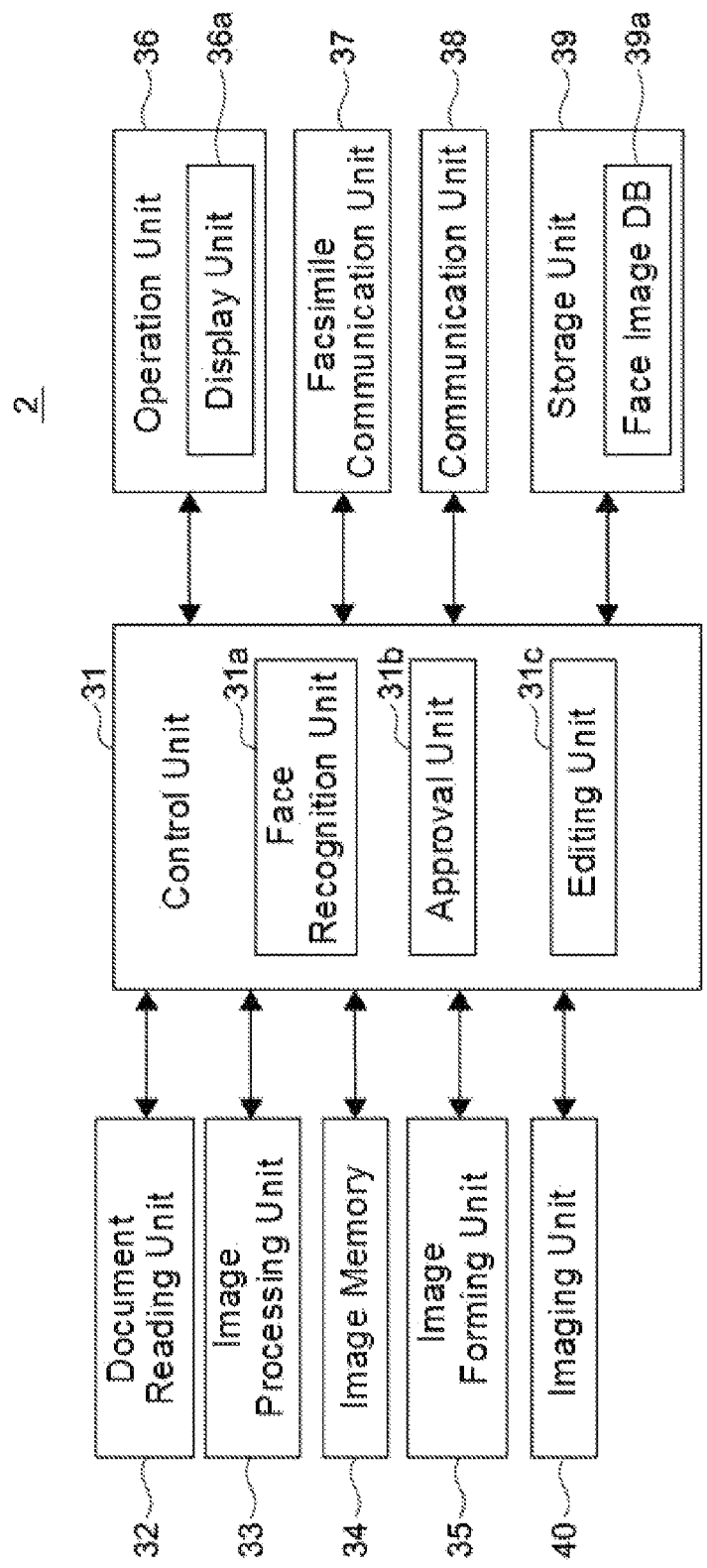
FIG. 2 illustrates a configuration when enabling the approval device according to the embodiment of the disclosure to function as an image forming apparatus.

Next, a description will be given of a configuration when enabling the approval device according to the embodiment of the disclosure to function as the image forming apparatus. FIG. 2 illustrates the configuration when enabling the approval device according to the embodiment of the disclosure to function as an image forming apparatus 2.

The image forming apparatus 2 includes a control unit 31. The control unit 31, which is mainly constituted of a CPU, a RAM, a ROM, a dedicated hardware circuit, or a similar device, manages overall operation control of the image forming apparatus 2.

The control unit 31 is mainly connected to a document reading unit 32, an image processing unit 33, an image memory 34, an image forming unit (output circuit) 35, an operation unit 36, a facsimile communication unit 37, a communication unit (document acquiring circuit, output circuit, second communication circuit) 38, a storage unit 39, an imaging unit 40, or a similar unit. The control unit 31 performs the operation control on the connected respective units and transmits and receives signals or data to/from the respective units.

The control unit 31 controls a driving and processing of a mechanism required to perform an operation control on each function, such as a scanner function, a printing function, a copy function, and a facsimile transmission/reception function based on an execution instruction of a job input by a user via the operation unit 36, a network-connected PC, or similar unit.

The control unit 31 includes a face recognition unit 31a, an approval unit 31b, and an editing unit 31c. The face recognition unit 31a, the approval unit 31b, and the editing unit 31c are function blocks achieved by executing a program loaded from the ROM or similar memory to the RAM by the CPU.

The face recognition unit 31a, the approval unit 31b, and the editing unit 31c correspond to the face recognition unit 21, the approval unit 22, and the editing unit 24 described above, respectively.

The document reading unit 32 reads the document being approved by the approver.

The image processing unit 33 performs image processing on the image data of the document read by the document reading unit 32 as necessary. For example, the image processing unit 33 performs the image processing such as a shading correction in order to improve a quality after image formation of the image read by the document reading unit 32.

The image memory 34 is a region that temporarily stores data of the image acquired by the document reading unit 32 reading and temporarily stores data of print target at the image forming unit 35.

The image forming unit 35 forms an image of the image data or similar data read by the document reading unit 32.

The operation unit 36 includes a touch panel unit and an operation key portion which accept instructions on various operations and processing executable by the image forming apparatus 2 from the user. The touch panel unit includes a display unit 36a, such as a liquid crystal display (LCD), with the touch panel.

The facsimile communication unit 37, which includes an encoding/decoding unit, a modulation/demodulation unit, and a network control unit (NCU) (not illustrated) performs transmission with a facsimile using a dial-up line network.

The communication unit 38, which is constituted of a communication module such as a local area network (LAN) board, transmits and receives various data to/from equipment (for example, PC) in a local area via one of a wired LAN and a wireless LAN.

The storage unit 39 mainly stores a document image read by the document reading unit 32, a face image database (DB) 39a in which data of the user's face is stored, or similar data. The storage unit 39 is a large-capacity storage device such as a hard disk drive (HDD), a solid state drive (SSD).

Up to this point, the configuration of the image forming apparatus 2 has been described.

Modification 1: Configuration as Image Forming Apparatus and Mobile Device

Figure 3:
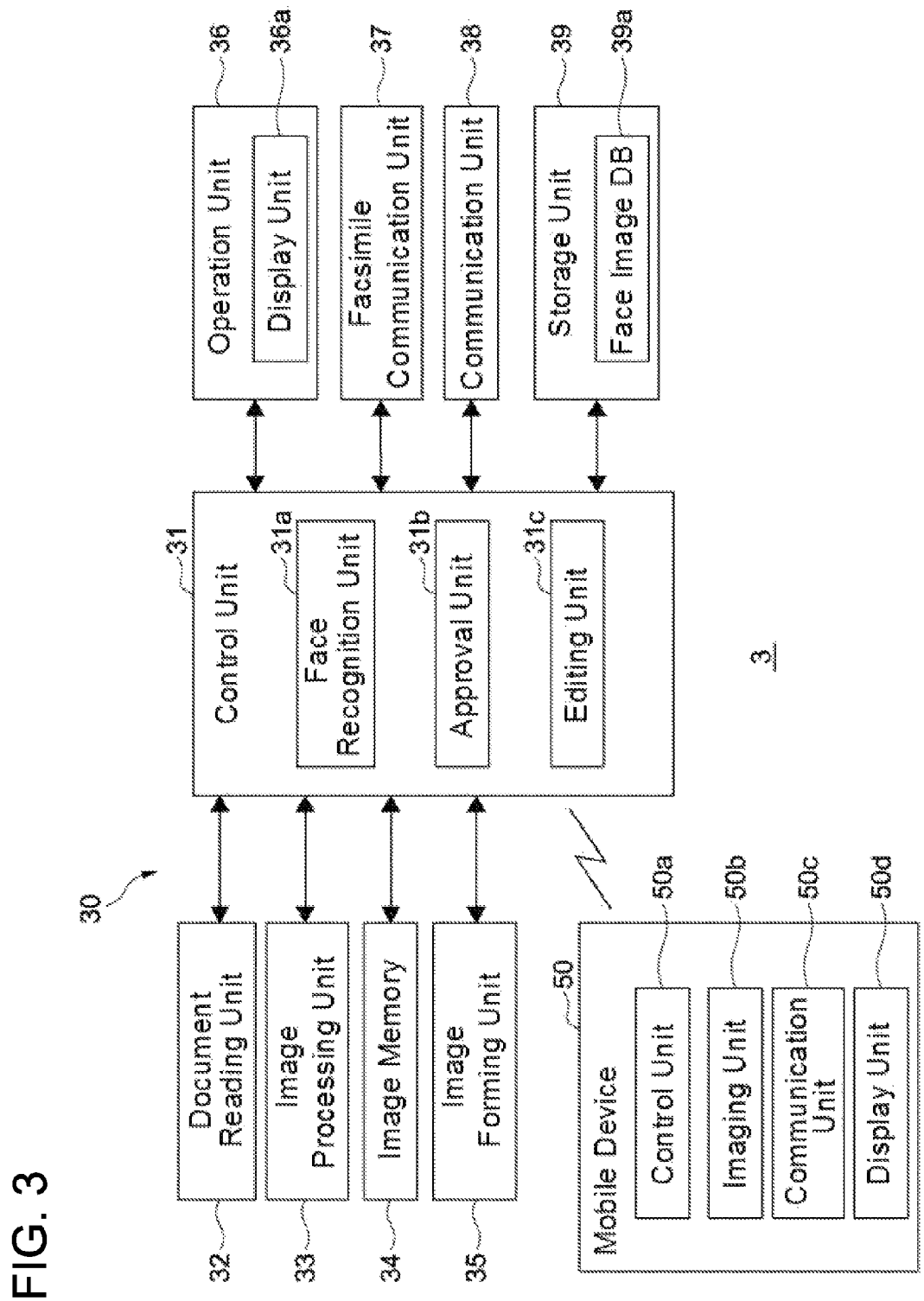
FIG. 3 illustrates a configuration of an approval system according to an embodiment of the disclosure achieved by the image forming apparatus and a mobile device.

Next, a description will be given of a configuration of the approval system according to the embodiment of the disclosure achieved by an image forming apparatus 30 and a mobile device 50. FIG. 3 illustrates a configuration of an approval system 3 according to the embodiment of the disclosure achieved by the image forming apparatus 30 and the mobile device 50. In the following description, the only different description from the image forming apparatus 2 will be provided.

For the above-described image forming apparatus 2, the imaging unit 40 is employed for imaging the approver's face, in which the image forming apparatus 2 includes. For the approval system 3, in contrast, an imaging unit 50*b* of the mobile device 50 belonging to the approver is employed for imaging the approver's face instead of the imaging unit 40. This configuration enables the disclosure to be implemented even if an image forming apparatus without the imaging unit 40 is provided.

The mobile device 50, which includes a control unit 50*a*, the imaging unit 50*b*, a communication unit (first communication unit) 50*c*, and a display unit 50*d*, can be achieved by a smart phone and a tablet type computer commonly.

The approval processing may be performed by accepting the approver's face image from the mobile device 50 belonging to the approver even if the image forming apparatus 2 with the imaging unit 40 is provided.

Up to this point, the configuration of the approval system according to the embodiment of the disclosure achieved by the image forming apparatus 30 and the mobile device 50 has been described.

Modification 2: Configuration when Employing User ID

Figure 4:
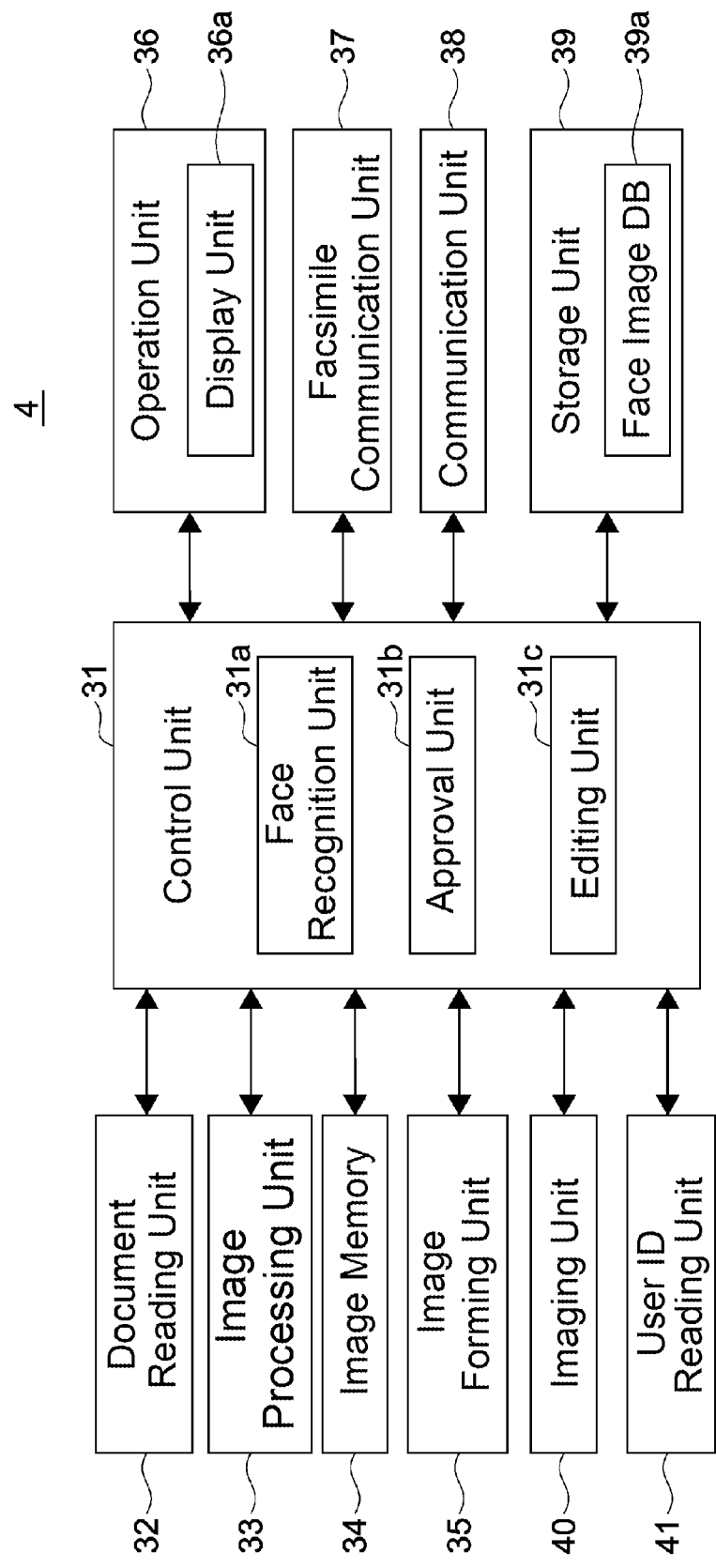
FIG. 4 illustrates a configuration when enabling the approval device according to the embodiment of the disclosure to function as an image forming apparatus employing a user ID.

Next, a description will be given of a configuration when enabling the approval device according to the embodiment of the disclosure to function as an image forming apparatus 4 employing a user ID (Identification). FIG. 4 illustrates the configuration when enabling the approval device according to the embodiment of the disclosure to function as the image forming apparatus 4 employing the user ID. In the following description, the only different description from the image forming apparatus 2 will be provided.

The image forming apparatus 4, unlike the image forming apparatus 2, additionally includes a user ID reading unit (user identifier acquiring unit) 41. The user ID reading unit 41 is a circuit that reads the user ID of the approver from an ID card and the mobile device 50 that belongs to the user as the approver.

The storage unit 39 stores the face image DB 39*a* in which the face image data is associated with the user ID of each user.

The face recognition unit 31*a* extracts the face image data, which is associated with the user ID acquired from the user ID reading unit 41, from the face image DB 39*a*, and determines whether the extracted face image data and the imaged face image match or not.

Up to this point, the configuration when enabling the approval device according to the embodiment of the disclosure to function as the image forming apparatus 4 employing the user ID has been described.

Flow of Processes

Next, a description will be given of a flow of processes in the approval device according to the embodiment of the disclosure. The description will be provided in the following order: an outline of basic processes, an outline of basic processes when enabling the approval device to function as a part of a workflow system, a detail of the basic processes, and a detail of processes when employing the user ID.

Outline of Basic Processes

Figure 5:
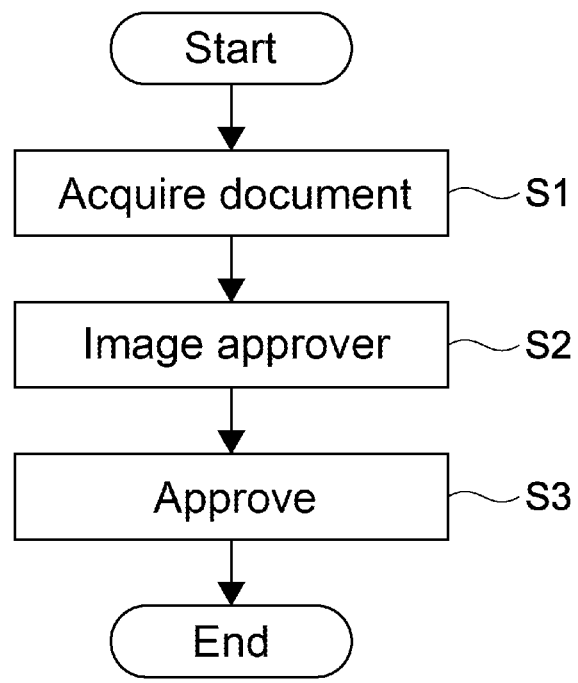
FIG. 5 illustrates an outline of a flow of basic processes in the approval device according to the embodiment of the disclosure.

First, an outline of a flow of basic processes in the approval device according to the embodiment of the disclosure will be described. FIG. 5 illustrates the outline of the flow of basic processes in the approval device according to the embodiment of the disclosure. Here, the flow of the processes will be described employing an example of the image forming apparatus 2.

First, the control unit 31 acquires the document required for the approval from the approver (Step S1). The document is read by the document reading unit 32 and electronized where the document is printed on the paper medium. The document is acquired via the communication unit 38 and the facsimile communication unit 37 where the document is an electronic file.

Next, the imaging unit 40 images the image of the approver's face (Step S2). It is not necessary for the approver to operate password entry or a similar operation for the approval but only to have his or her face image imaged. This ensures the reduced time and labor to approve.

Next, the face recognition unit 31*a* recognizes the imaged face to verify with the stored face image data. Accordingly, the approval unit 31*b* approves the document (Step S3).

The outline of the basic processes in the approval device according to the embodiment of the disclosure is described above.

Figure 6:
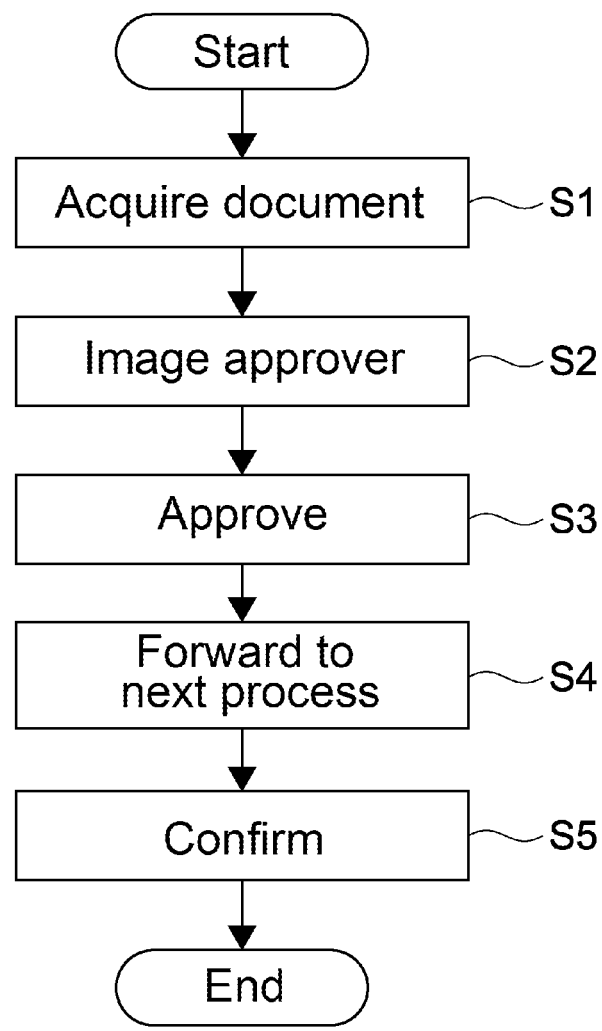
FIG. 6 illustrates an outline of basic processes when enabling the approval device according to the embodiment of the disclosure to function as a part of a workflow system.

Outline of Basic Processes when Enabling Approval Device to Function as Part of Workflow System Next, a description will be given of an outline of basic processes when enabling the approval device according to the embodiment of the disclosure to function as a part of a workflow system. FIG. 6 illustrates the outline of the basic processes when enabling the approval device according to the embodiment of the disclosure to function as a part of the workflow system. Here, the flow of the processes will be described employing the example of the image forming apparatus 2.

The workflow system is a system that causes the process to proceed by forwarding the document in a predetermined order among the users having a predetermined role in order to perform a task.

First, the control unit 31 acquires the document required for the approval from the approver (Step S1). The approver is the first user who forwards the document in the workflow system. The document is read by the document reading unit 32 and electronized where the document is printed on the paper medium.

The document is acquired via the communication unit 38 where the document is electronically forwarded from the user who has performed the process prior to the approver in the workflow system.

Next, the imaging unit 40 images the image of the approver's face (Step S2).

Next, the face recognition unit 31*a* recognizes the imaged face to verify with the stored face image data. Accordingly, the approval unit 31*b* approves the document (Step S3).

Next, the control unit 31 forwards the approved document to the following user in the workflow system (Step S4). The following user may be predefined in the workflow system and specified by the approver. Where the following user is predefined, the document may be automatically forwarded upon approval.

Next, the control unit 31 notifies the user as the approver of completion of the forwarding for confirmation (Step S5). The notification may be performed by an operation such as delivery of electronic data, and printing to output the document to which the approver's stamp or a similar stamp is attached, as a hard copy.

The outline of the basic processes when enabling the approval device according to the embodiment of the disclosure to function as a part of the workflow system is described above.

Detail of Basic Processes

Figure 7:
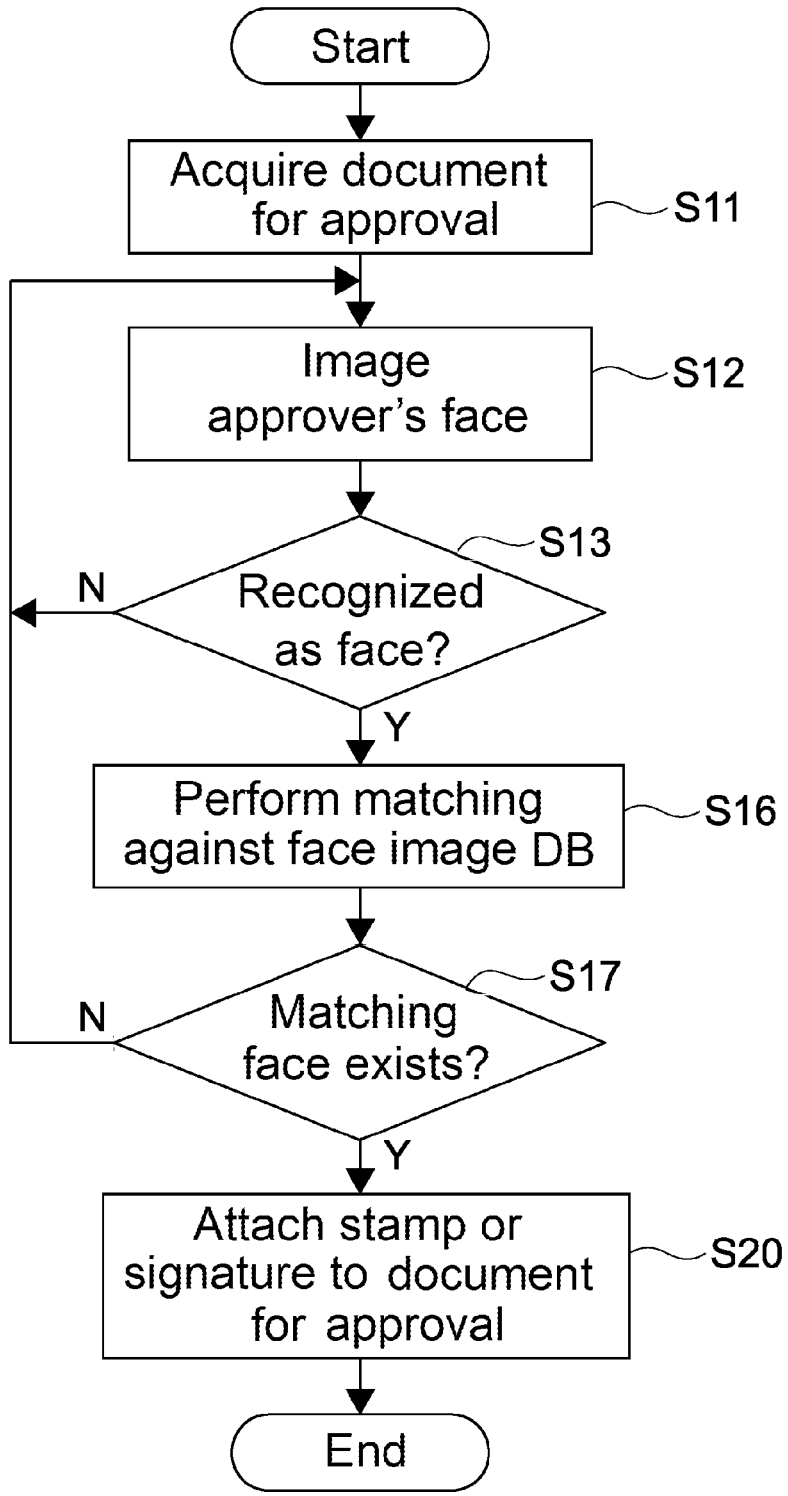
FIG. 7 illustrates a detail of the flow of the basic processes in the approval device according to the embodiment of the disclosure.

Next, a description will be given of a detail of the flow of the basic processes in the approval device according to the embodiment of the disclosure. FIG. 7 illustrates the detail of the flow of the basic processes in the approval device according to the embodiment of the disclosure. Here, the flow of the processes will be described employing the example of the image forming apparatus 2.

First, the control unit 31 acquires the document required for the approval from the approver (Step S11). This step corresponds to the above-described Step S1.

Next, the control unit 31 controls to cause the imaging unit 40 to image the approver's face (Step S12).

Next, the face recognition unit 31a determines whether or not capable of recognizing the face from the image imaged (Step S13).

When no face is recognized (N at Step S13), the face recognition unit 31a returns the process to the Step S12.

When the face is recognized (Y at Step S13), the face recognition unit 31a performs matching the data in the face image DB 39a stored in the storage unit 39 against the data of face image imaged and recognized (Step S16).

When no matching face image data exists (N at Step S17), the face recognition unit 31a returns the process to the Step S12.

When the matching face image data exists (Y at Step S17), the approval unit 31b approves the document and provides instruction to the editing unit 31c. The approval unit 31b causes the editing unit 31c to attach the electronic stamp or the electronic signature to the document (Step S20).

The detail of the flow of the basic processes in the approval device according to the embodiment of the disclosure is described above.

Detail of Processes when Employing User ID

Figure 8:
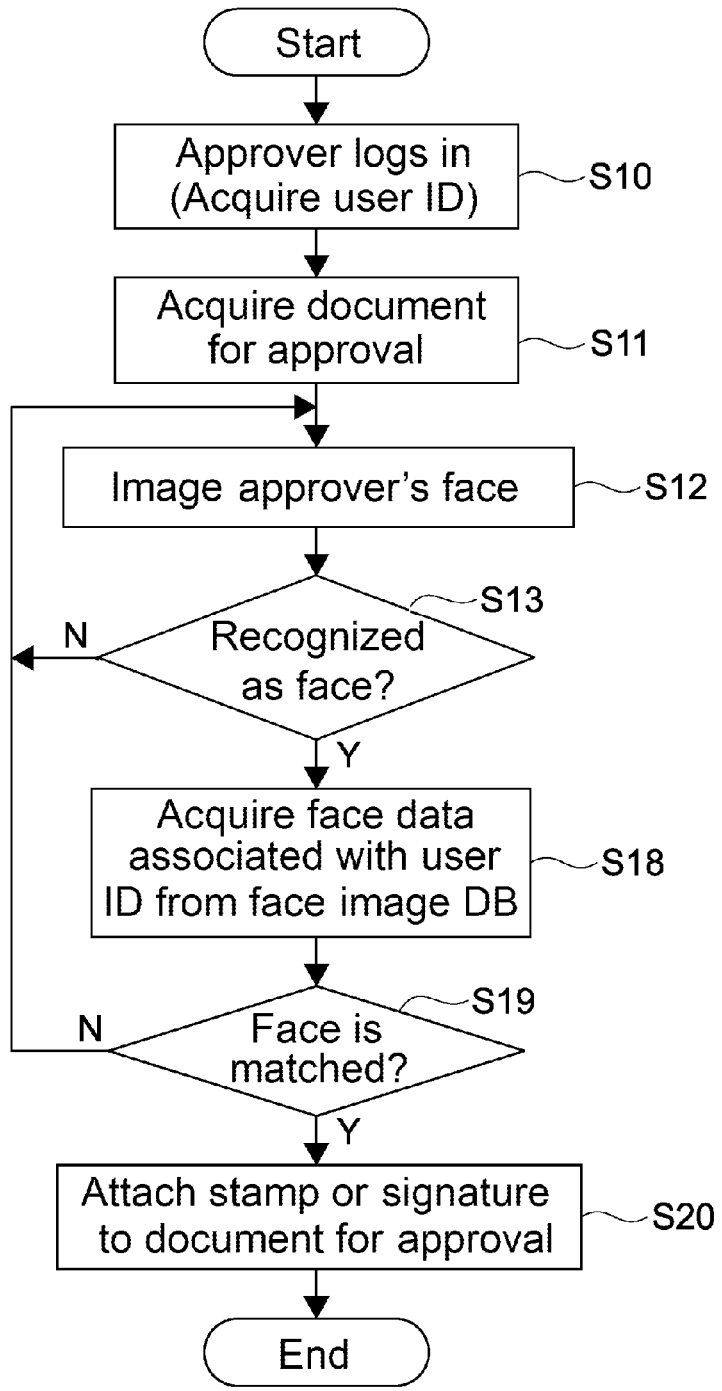
FIG. 8 illustrates a detail of processes in the approval device according to the embodiment of the disclosure when employing the user ID.

Next, a description will be given of a detail of processes in the approval device according to the embodiment of the disclosure when employing the user ID. FIG. 8 illustrates the detail of the processes in the approval device according to the embodiment of the disclosure when employing the user ID. Here, the flow of the processes will be described employing the example of the image forming apparatus 4.

Employing the user ID, for example, can prevent a chief manager from performing the approval operations when the only officials at the rank of a general manager or higher can approve.

First, the user as the approver logs in the image forming apparatus 4 (Step S10). The user ID reading unit 41 acquires the user ID of the user from one of an IC card and the mobile device 50 that belongs to the user, when logging in.

Next, the control unit 31 acquires the document required for the approval from the approver (Step S11).

Next, the control unit 31 controls to cause the imaging unit 40 to image the approver's face (Step S12).

Next, the face recognition unit 31a determines whether or not capable of recognizing the face from the image imaged (Step S13).

When no face is recognized (N at Step S13), the face recognition unit 31a returns the process to the Step S12.

When the face is recognized (Y at Step S13), the face recognition unit 31a extracts the face image data which associated with the acquired user ID, from the face image DB 39a (Step S18).

Next, the face recognition unit 31a determines whether the face image data acquired from the image imaged, and the face image data extracted from the face image DB 39a, match or not (Step S19).

When the face image data are not matched (N at Step S19), the face recognition unit 31a returns the process to the Step S12.

When the face image data are matched (Y at Step S19), the approval unit 31b approves the document and provides the instruction to the editing unit 31c. The approval unit 31b causes the editing unit 31c to attach the electronic stamp or the electronic signature to the document (Step S20).

The detail of the processes in the approval device according to the embodiment of the disclosure when employing the user ID is described above.

Up to this point, the flow of the processes in the approval device according to the embodiment of the disclosure has been described.

Modification 3: Process of Preventing Identity Theft

Next, a description will be given of a detail of processes in a situation where an image forming apparatus 2 or an image forming apparatus 4 further includes a function of preventing an identity theft.

Principles of Preventing Identity Theft

Figure 9:
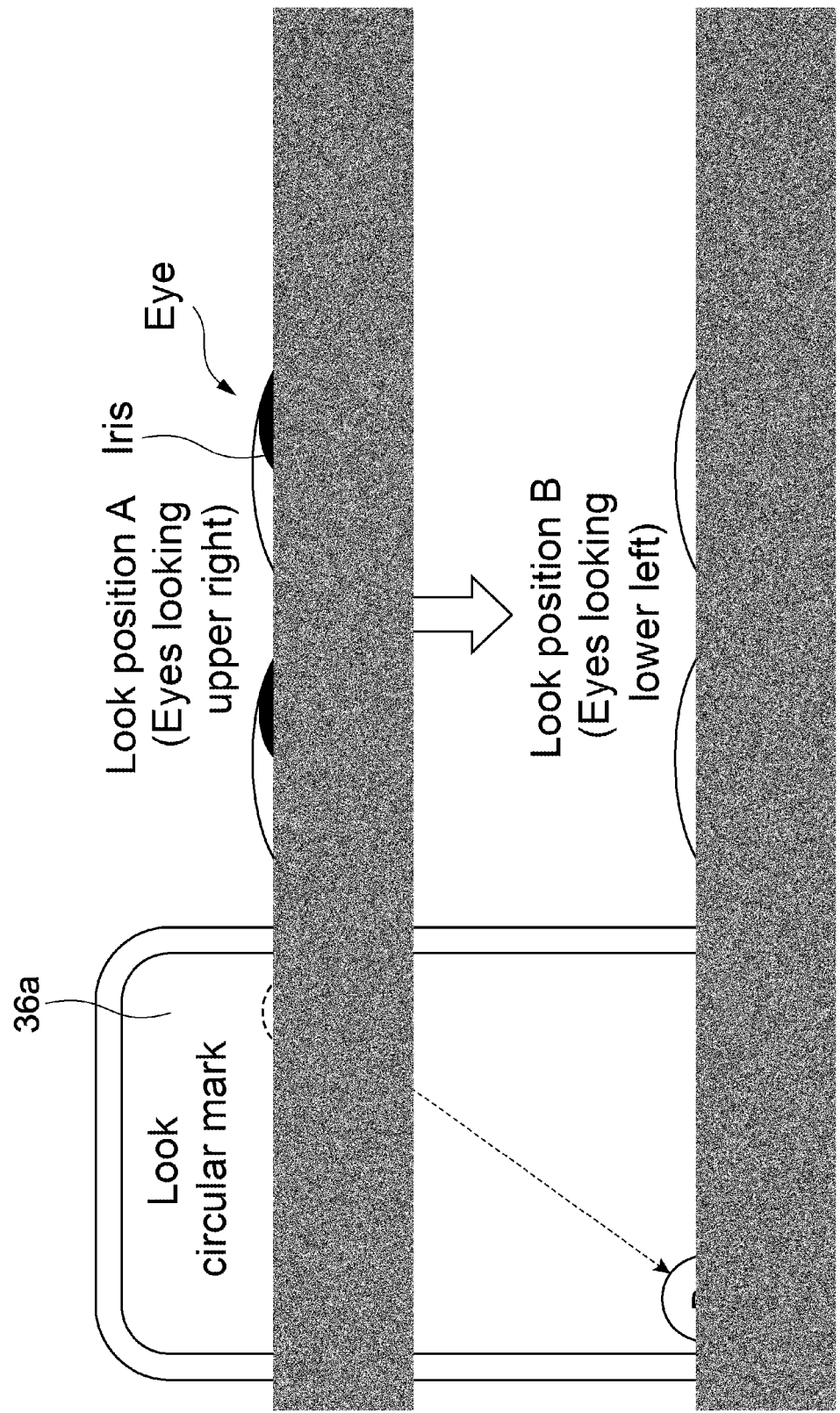
FIG. 9 illustrates principles of a function of preventing an identity theft.

First, principles of the function of preventing the identity theft will be described. FIG. 9 illustrates the principles of the function of preventing the identity theft.

As illustrated in the left side of FIG. 9, a circular mark is displayed on the screen of one of the display unit 36a and the mobile device 50. Subsequently, the circular mark is moved from a position A to a position B on the screen.

The user is instructed to follow the moving circular mark with his or her eyes. In that case, the user's eyes (irises of the eyes) move from an upper right direction to a lower left direction as illustrated in the right side of FIG. 9.

The face recognition unit 31a detects this eye movement to confirm the identity of the approver who is in front of an imaging unit for imaging, rather than the identity theft done by another person with using a photograph or similar data.

Flow of Processes in Image Forming Apparatus 2

Figure 10:
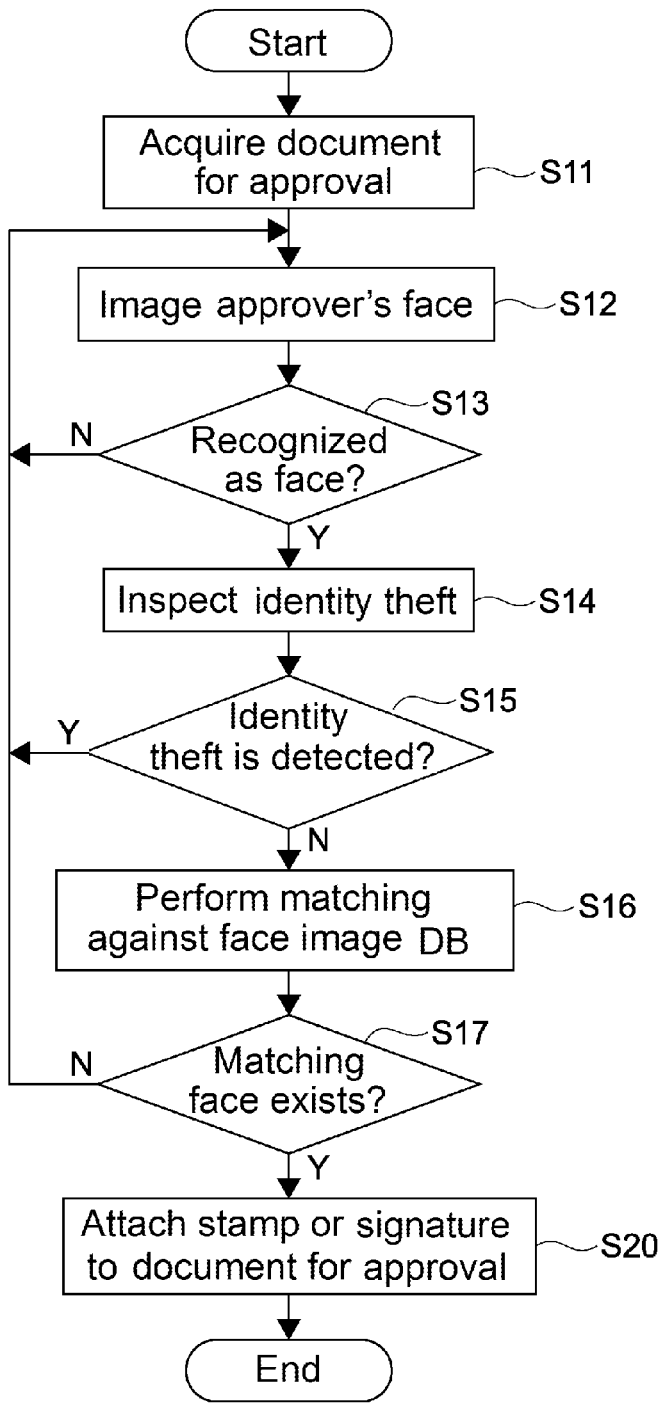
FIG. 10 illustrates a flow of processes in an image forming apparatus including the function of preventing the identity theft.

Next, a description will be given of a flow of processes in the image forming apparatus 2 including the function of preventing the identity theft. FIG. 10 illustrates the flow of the processes in the image forming apparatus 2 including the function of preventing the identity theft.

First, the control unit 31 acquires the document required for the approval from the approver (Step S11).

Next, the control unit 31 controls to cause the imaging unit 40 to image the approver's face (Step S12).

Next, the face recognition unit 31a determines whether or not capable of recognizing the face from the image imaged (Step S13).

When no face is recognized (N at Step S13), the face recognition unit 31a returns the process to the Step S12.

When the face is recognized (Y at Step S13), the face recognition unit 31a inspects the identity theft according to the above-described principles (Step S14).

Next, the face recognition unit 31a determines: whether or not a target person of which the imaging unit 40 plans to image, is not a photograph or similar data; and whether or not the identity theft is detected, based on the results of the identity theft inspection (Step S15).

When determined that the identity theft is detected (Y at Step S15), the face recognition unit 31a returns the process to the Step S12.

When determined that the identity theft is not detected (N at Step S15), the face recognition unit 31a performs matching the data in the face image DB 39a stored in the storage unit 39 against the data of face image imaged and recognized (Step S16).

When no matching face image data exists (N at Step S17), the face recognition unit 31a returns the process to the Step S12.

When the matching face image data exists (Y at Step S17), the approval unit 31b approves the document and provides instruction to the editing unit 31c. The approval unit 31b causes the editing unit 31c to attach the electronic stamp or the electronic signature to the document (Step S20).

The flow of the processes in the image forming apparatus 2 including the function of preventing the identity theft is described above.

Flow of Processes in Image Forming Apparatus 4

Figure 11:
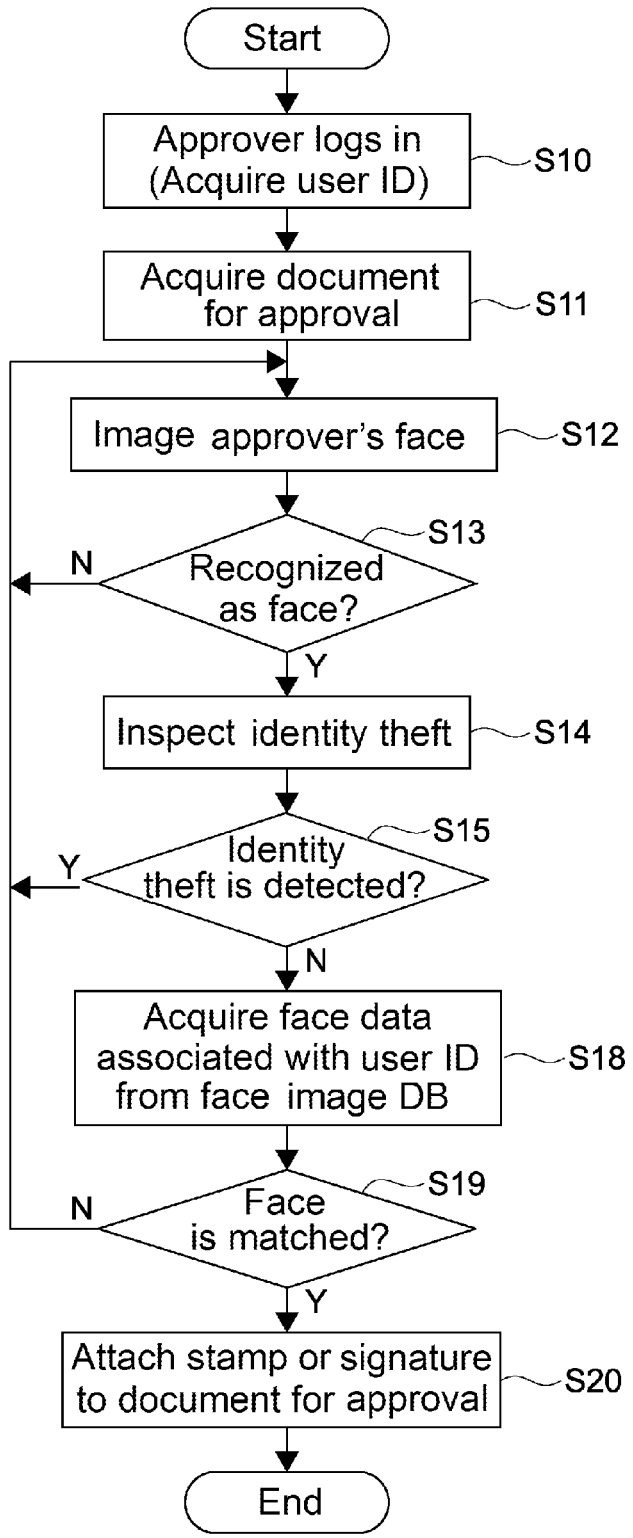
FIG. 11 illustrates a flow of processes in an image forming apparatus including the function of preventing the identity theft.

Next, a description will be given of a flow of processes in the image forming apparatus 4 including the function of preventing the identity theft. FIG. 11 illustrates the flow of the processes in the image forming apparatus 4 including the function of preventing the identity theft.

First, the user as the approver logs in the image forming apparatus 4 (Step S10). The user ID reading unit 41 acquires the user ID of the user from one of the IC card and the mobile device 50 that belongs to the user, when logging in.

Next, the control unit 31 acquires the document required for the approval from the approver (Step S11).

Next, the control unit 31 controls to cause the imaging unit 40 to image the approver's face (Step S12).

Next, the face recognition unit 31a determines whether or not capable of recognizing the face from the image imaged (Step S13).

When no face is recognized (N at Step S13), the face recognition unit 31a returns the process to the Step S12.

When the face is recognized (Y at Step S13), the face recognition unit 31a inspects the identity theft according to the above-described principles (Step S14).

Next, the face recognition unit 31a determines: whether or not the target person of which the imaging unit 40 plans to image, is not the photograph or similar data; and whether or not the identity theft is detected, based on the results of the identity theft inspection (Step S15).

When determined that the identity theft is detected (Y at Step S15), the face recognition unit 31a returns the process to the Step S12.

When determined that the identity theft is not detected (N at Step S15), the face recognition unit 31a extracts the face image data which associated with the acquired user ID, from the face image DB 39a (Step S18).

Next, the face recognition unit 31a determines whether the face image data acquired from the image imaged, and the face image data extracted from the face image DB 39a, match or not (Step S19).

When the face image data are not matched (N at Step S19), the face recognition unit 31a returns the process to the Step S12.

When the face image data are matched (Y at Step S19), the approval unit 31b approves the document and provides the instruction to the editing unit 31c. The approval unit 31b causes the editing unit 31c to attach the electronic stamp or the electronic signature to the document (Step S20).

The flow of the processes in the image forming apparatus 4 including the function of preventing the identity theft is described above.

The detail of the processes in the image forming apparatus 2 or the image forming apparatus 4 that further includes the function of preventing the identity theft has been described as above. Accordingly, it is possible to conveniently perform the approval operations of the electronic document and appropriately confirm the identity of the approver. As a result, this can prevent another person from doing an impersonation of the approver to approve, even if, for example, an ID and a password are stolen.

SUPPLEMENTARY NOTE

It will be appreciated that the disclosure will not be limited to the embodiments described above, and many variations thereof are possible without departing from the spirit of the disclosure.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An approval device comprising:
a storage circuit that stores a face image database, the face image database registering face image data of at least one user to be an approver for approving a document;
a document acquiring circuit that acquires the document;
an imaging circuit that images a face of the approver for approving the document;
a face recognition circuit that analyzes an imaged face image of the approver and searches the face image database stored in the storage circuit using the analysis result;
an approval circuit that approves the document based on the search result;
an editing circuit that attaches one of an electronic stamp and an electronic signature to the approved document; and
a display circuit that ensures a display of a mark on a screen of the approval device; wherein
the face recognition circuit instructs the approver to look at the mark, causes the displayed mark to move on the screen, causes the imaging circuit to image movement of eyes of the approver due to the movement of the mark, and detects the imaged eye movement of the approver, so as to verify that the approver is a human being.

2. The approval device according to claim 1, wherein:
the face image database correlates the face image data with a user identifier uniquely identifying each user and registers the face image data and the user identifier;
the approval device further includes a user identifier acquiring circuit that acquires the user identifier of the approver;
the face recognition circuit correlates the face image data with the analysis result, the face image data being obtained by searching the face image database using the acquired user identifier; and
the approval circuit approves the document based on the collation result.

3. The approval device according to claim 1, wherein the editing circuit attaches the face image of the approver to the approved document.

4. The approval device according to claim 1, wherein the editing circuit adds information on at least one of a date and a place of the approval to the approved document.

5. The approval device according to claim 1, further comprising an output circuit that outputs the document with respect to the approver after one of the electronic stamp and the electronic signature is attached to the approved document.

6. An approval system comprising:
an approval device; and
a mobile device; wherein
the mobile device includes
    an imaging circuit that images a face of an approver for approving a document, and
    a first communication circuit that transmits an imaged face image of the approver to the approval device;
the approval device includes
    a storage circuit that stores a face image database, the face image database registering face image data of at least one user to be the approver,
    a document acquiring circuit that acquires the document,
    a second communication circuit that receives the face image of the approver,
    a face recognition circuit that analyzes the received face image of the approver and searches the face image database stored in the storage circuit using the analysis result,
    an approval circuit that approves the document based on the search result, and
    an editing circuit that attaches one of an electronic stamp and an electronic signature to the approved document;
either the approval device or the mobile device includes
    a display circuit that ensures a display of a mark on a screen of either the approval device or the mobile device; and
the face recognition circuit instructs the approver to look at the mark, causes the displayed mark to move on the screen, causes the imaging circuit to image movement of eyes of the approver due to the movement of the mark, and detects the imaged eye movement of the approver, so as to verify that the approver is a human being.

7. A non-transitory computer-readable recording medium storing an approval program to control an approval device, the approval program causing the approval device to function as:
a storage circuit that stores a face image database, the face image database registering face image data of at least one user to be an approver for approving a document;
a document acquiring circuit that acquires the document;
an imaging circuit that images a face of the approver for approving the document;
a face recognition circuit that analyzes an imaged face image of the approver and searches the face image database stored in the storage circuit using the analysis result;
an approval circuit that approves the document based on the search result;
an editing circuit that attaches one of an electronic stamp and an electronic signature to the approved document; and
a display circuit that ensures a display of a mark on a screen of the approval device; wherein
the face recognition circuit instructs the approver to look at the mark, causes the displayed mark to move on the screen, causes the imaging circuit to image movement of eyes of the approver due to the movement of the mark, and detects the imaged eye movement of the approver, so as to verify that the approver is a human being.

* * * * *